United States Patent [19]

Bullen et al.

[11] Patent Number: 4,707,517

[45] Date of Patent: Nov. 17, 1987

[54] POLYMER COMPOSITION

[75] Inventors: David J. Bullen, Falkirk, United Kingdom; Jeffrey D. Umpleby, Ferney-Voltaire, France

[73] Assignee: BP Chemicals Limited, London, England

[21] Appl. No.: 755,267

[22] Filed: Jul. 15, 1985

[30] Foreign Application Priority Data

Jul. 20, 1984 [GB] United Kingdom ............... 8418591

[51] Int. Cl.[4] ............................................. C08L 51/04
[52] U.S. Cl. ..................................... 525/72; 525/104; 525/199
[58] Field of Search ........................ 525/72, 104, 199

[56] References Cited

U.S. PATENT DOCUMENTS

| 3,125,547 | 3/1964 | Blatz | 260/45.5 |
|---|---|---|---|
| 3,385,812 | 5/1968 | Brachman | 525/104 |
| 3,408,420 | 10/1968 | Wiggill | 525/104 |
| 3,538,028 | 11/1970 | Morgan | 525/104 |
| 4,028,431 | 6/1977 | Futami et al. | 525/199 |
| 4,045,402 | 8/1977 | Bjerk et al. | 525/199 |
| 4,197,380 | 4/1980 | Chao et al. | 525/199 |
| 4,323,603 | 4/1982 | Close | 525/104 |
| 4,369,279 | 1/1983 | Emerick | 525/104 |

FOREIGN PATENT DOCUMENTS 76082474  1/1978  Japan .

Primary Examiner—Joseph L. Schofer
Assistant Examiner—Bernard Lipman
Attorney, Agent, or Firm—Brooks Haidt Haffner & Delahunty

[57] ABSTRACT

A crosslinkable thermoplastic polymeric composition comprising a component inherently adapted for crosslinking by thermal or chemical treatment e.g. a peroxide-containing polyolefin component or a silane-modified polyolefin and a fluorocarbon polymer. The composition can be thermoformed to produce useful articles e.g. cable insulation and the presence of the fluorocarbon polymer (e.g. a copolymer of vinylidene fluoride and hexafluoropropylene) results in the articles having improved surface finish.

14 Claims, No Drawings

POLYMER COMPOSITION

The present invention relates to crosslinkable thermoplastic polymeric compositions which can be thermoformed, for example by extrusion, and subsequently crosslinked to give products having improved properties.

More particularly the present invention relates to thermoplastic polymeric compositions which are inherently adapted for crosslinking by thermal or chemical treatment subsequent to being thermoformed into finished or partially finished products. Examples of known compositions of this type are those comprising peroxide-containing polymer compositions which are adapted to be crosslinked by heating products thermoformed therefrom to a temperature higher than the thermoforming temperature; and silane modified polymers which are adapted to be crosslinked by treatment with water, generally in the presence of a silanol condensation catalyst, subsequent to thermoforming of the silane modified polymer.

Examples of thermoplastic polymers which can be crosslinked by thermal treatment in the presence of peroxide are conventional low density polyethylenes and ethylene vinyl acetate copolymers produced by the high pressure process, high density polyethylene and linear low density polyethylene. Peroxide modification of thermoplastic polymers to produce crosslinkable grades can, for example, be carried out by mixing the polymer powder or pellet with a suitable organic peroxide under conditions such that the peroxide is physically dispersed throughout the polymer for example in the mixing zone of an extruder or similar mixing device, and then thermoforming the mixture (e.g. by extrusion through a die) to produce shaped articles. The articles are heat treated at a temperature higher than the thermoforming temperature to decompose the peroxide and thereby to crosslink the polymer. The selection of a suitable peroxide in this process is primarily dictated by the fact that the peroxide should be relatively stable at the thermoforming temperature and should decompose to cause crosslinking of the polymer at temperatures above the thermoforming temperature but below the decomposition temperature of the polymer and preferably below the temperature at which the produced article commences to lose its dimensional stability. Processes of this type are described, for example, in GB Nos. -A-831126, -A-865384 and U.S. Pat. No. 4,101,512.

Thermoplastic silane-modified polymers are organic polymers containing hydrolysable groups (attached to the silicon) that can be crosslinked by hydrolysis, e.g. by the action of water, preferably in the presence of a silanol condensation catalyst. Crosslinkable silane-modified copolymers can be manufactured, for example, by copolymerising unsaturated organic monomers with unsaturated silane compounds containing hydrolysable groups. Examples of copolymers of this type are described in GB-A-2028831 and -A-2039513 which disclose the preparation of crosslinkable copolymers of ethylene and an ethylenically unsaturated silane compound by copolymerising the monomers at relatively high temperatures and pressures in the presence of a radical polymerisation initiator. Further examples of copolymers of this type are described in GB-A-1415194 which discloses the preparation of crosslinkable copolymer by contacting ethylene, optionally with other olefinically unsaturated comonomer, and a terminally unsaturated silane compound with certain defined Ziegler catalysts under polymerisation conditions which preferably employ relatively low temperatures and pressures.

Another known method for making such crosslinkable silane-modified organic polymers comprises graft-polymerising an ethylenically unsaturated silane compound on to an organic polymer preferably in the presence of a free radical initiator. Examples of this method are disclosed in GB-A-1357549, GB-A-1234034 and GB-A-1286460. The graft-polymerisation method forms the basis of the well-known "SIOPLAS" (RTM) commercial technique for making crosslinkable thermoplastic polymers. In the well known single-step "MONOSIL" (RTM) process for making crosslinkable compositions of this type an ethylenically unsaturated silane compound is graft-polymerised on to an organic polymer in the presence of a free radical initiator and a silanol condensation catalyst. In this process the grafting reaction is performed simultaneously with the fabrication of the polymeric article, for example, by feeding the organic polymer, the unsaturated silane compound, the initiator and the silanol condensation catalyst (optionally with conventional additives) to an extruder wherein the grafting reaction occurs and a crosslinkable product is extruded directly.

Crosslinkable organic polymers can be fabricated to form a large variety of useful articles by conventional thermoforming techniques, for example, extrusion, injection moulding, blow-moulding and film-blowing processes.

A problem encountered with crosslinkable thermoplastic compositions of the aforedescribed types is that, during thermoforming of such compositions into useful articles, premature crosslinking can take place, for example, due to thermal or mechanical effects or to the presence of moisture or other impurities. Premature crosslinking can also occur in "dead" spaces in extruders or dies, e.g. spaces where eddies form in the melt flow pattern or where the melt can stagnate. Premature crosslinking in the thermoplastic polymeric melt causes imperfections in the final thermoformed article, for example, visible surface defects such as "fish-eyes" and streaking in extruded products.

It is an object of the present invention to provide an improved crosslinkable thermoplastic polymeric composition. It is a further object of the invention to provide a crosslinkable thermoplastic polymeric composition which can be extruded to provide products having improved surface finish.

Accordingly the present invention provides a crosslinkable thermoplastic polymeric composition comprising a component inherently adapted for crosslinking by thermal or chemical treatment characterised in that a fluorocarbon polymer is present in the composition.

The present invention further provides a process for making a crosslinkable thermoplastic composition comprising blending together components comprising a component inherently adapted for crosslinking by chemical or thermal treatment and a fluorocarbon polymer.

The present invention further provides a process for the production of a crosslinkable thermoplastic article comprising thermoforming the article from a crosslinkable thermoplastic polymeric composition comprising a component inherently adapted for crosslinking by thermal or chemical treatment subsequent to the thermoforming characterised in that a fluorocarbon polymer is present in the composition.

The component inherently adapted for crosslinking by thermal or chemical treatment is hereinafter referred to as the "crosslinkable component".

The fluorocarbon polymer employed in the composition of the present invention is suitably capable of forming a melt extrudable blend with the crosslinkable component of the composition. Preferably the fluorocarbon polymer melts or softens at a temperature in the range 100°-300° C., more preferably in the range 150° to 250° C. Fluorocarbon homo- and copolymers especially suitable for use in the composition of the present invention are disclosed in U.S. Pat. No. 3,125,547. Such homo- and copolymers have an atomic ratio of fluorine to carbon of at least 1:2. They comprise, for example, homo and copolymers of one or more of vinylidene fluoride, vinyl fluoride, chlorotrifluoro ethylene, tetrafluoroethylene and hexafluoropropylene. Copolymers of these fluorinated olefins with unfluorinated olefins can be employed in the composition of the present invention provided the copolymer contains an atomic ratio of fluorine to carbon of at least 1:2. Specific examples of fluorocarbon polymers which can be suitably employed in the present invention are telomers of tetrafluoroethylene, telomers of chlorotrifluoroethylene and fluorocarbon elastomers, for example copolymers of hexafluoropropylene and vinylidene fluoride.

The quantity of fluorocarbon polymer employed in the composition of the present invention is suitably in the range 0.002 to 2.0 weight %, preferably 0.03 to 0.4 weight % based on the weight of the crosslinkable component. When the crosslinkable component employed in the present invention is a silane-modified polymer it is particularly preferred to use a quantity of fluorocarbon polymer in the range 100 to 450 ppm based on the weight of the crosslinkable component.

The fluorocarbon polymer can be incorporated into the crosslinkable composition of the present invention using any of the blending or mixing techniques conventionally employed in the art. For example, the fluorocarbon polymer can be incorporated directly into crosslinkable silane modified polymer or into the polymeric material used to form the base of a peroxide-crosslinkable component. Alternatively, the fluorocarbon polymer can be blended with thermoplastic polymer, for example low density polyethylene, to form a masterbatch concentrate which can then be blended or compounded into the crosslinkable component or into a precursor of the crosslinkable component, for example, the "base" peroxide crosslinkable polymer prior to mixing with peroxide.

The crosslinkable component present in the composition of the present invention can be for example a thermally crosslinkable mixture comprising an organic polymer and an organic peroxide of the type described above, or a silane modified polymer crosslinkable by the action of water or other chemical agency. In the case of the crosslinkable component comprising an organic polymer and an organic peroxide, the organic polymer is preferably a polyolefin or a copolymer of an olefin with one or more other olefins or unsaturated esters. Particularly preferred organic polymers are conventional (high pressure) low density polyethylene, high density linear polyethylene, linear low density polyethylene, ethylene/alkyl acrylate copolymer (e.g. ethylene/ethylacrylate), ethylene/alkenyl carboxylate copolymer (e.g. ethylene/vinyl acetate) and blends of such polymers and/or copolymers.

The concentration of peroxides in such crosslinkable components will normally be in accordance with conventional practise in the art, for example the peroxide content will normally be in the range 0.05 to 10 weight %, preferably 0.1 to 5.0 weight % based on the weight of peroxide plus organic polymer.

In the case of the crosslinkable component comprising a silane modified polymer, this can be, for example, a copolymer prepared by copolymerising an olefinically unsaturated compound with an unsaturated silane compound having hydrolysable groups, a graft copolymer prepared by grafting an unsaturated silane compound having hydrolysable silane groups on to an organic polymer or a copolymer modified to contain hydrolysable silane groups by a transesterification process (see for example EP4752). Preferred silane modified polymers are copolymers prepared by copolymerising ethylene, optionally together with one or more alpha-olefins, vinyl esters, alkyl(meth)acrylates, unsaturated nitriles or unsaturated ethers(e.g. vinyl ethers), with an unsaturated silane compound in the presence of a free radical initiator. Also preferred are graft copolymers prepared by grafting an unsaturated silane compound on to polyethylene or on to a copolymer of ethylene with one or more alpha-olefins, vinyl esters, alkyl(meth)acrylates, unsaturated nitriles or unsaturated ethers(e.g. vinyl ethers), by heating the polyethylene, or copolymer of ethylene, with the unsaturated silane compound in the presence of a free radical initiator, for example, an organic peroxide. The polyethylene or copolymer of ethylene can comprise, for example, low density polyethylene, low density ethylene hydrocarbon copolymers (e.g. LLDPE), high density polyethylene, ethylene/ethyl acrylate copolymer, ethylene/vinyl acetate copolymer or ethylene propylene rubber (EPR).

The silane modified polymer can be formed "in situ"- 'in the presence of the other component(s) of the composition of the present invention, for example, by grafting an unsaturated silane compound on to polyethylene or on to a copolymer of ethylene of the type described above in the presence of a free radical polymerisation initiator.

The silane compound copolymerised with the ethylene, or graft copolymerised with the polyethylene or copolymer of ethylene, is preferably a compound having the general formula $R^1SiR^2_nY_{3-n}$ wherein $R^1$ represents an ethylenically unsaturated hydrocarbyl or hydrocarbyloxy group; $R^2$ represents an aliphatic saturated hydrocarbyl group; Y represents a hydrolysable organic group; and n represents zero, 1 or 2. Preferred unsaturated silane compounds for use in making the copolymer or graft copolymer are vinyl trimethoxy silane, vinyl triethoxy silane and vinyl triacetoxy silane.

Silane modified polymers particularly preferred for use as the crosslinkable component in the composition of the present invention are copolymers prepared by copolymerising ethylene, optionally together with up to 40% by weight (based on ethylene) of additional monomer selected from one or more vinyl esters or (meth)acrylates, and an unsaturated silane compound selected from vinyl trialkoxy silanes and vinyl triacetoxy silane, under a pressure of from 500 to 4000 bars and at a temperature in the range 150° to 400° C. in the presence of a free radical polymerisation initiator.

The silane modified polymer is preferably a copolymer or a graft copolymer containing 0.1–10 wt %, most preferably 0.5 to 5 wt % of copolymerised units of the silane compound.

For further details of silane modified polymers suitable for use in the present invention reference may be made to GB-A-2028831, GB-A-2039513, GB-A-1357549, GB-A-1415194, GB-A-1286460, GB-A-1234034 U.S. Pat. No. 3,225,018 and EP No. 4752.

In the process of the present invention the thermoforming can be, for example, extrusion, extrusion coating, blow moulding, injection moulding, film-blowing or slot-casting. The process is particularly suitable for the production of extruded or extrusion-coated articles, for example pipe, tubing and insulated wire and cable.

In a particularly preferred embodiment of the present invention a masterbatch is made up comprising a masterbatch base polymer, for example LDPE, LLDPE or ethylene alkyl acrylate copolymer, together with the fluorocarbon polymer and optional additives, for example, antioxidants, fillers, metal deactivators (e.g. salicylaldehyde oximes), lubricants, water-tree inhibitors, foaming agent, flame retardents and pigments.

A further aspect of the present invention provides a crosslinkable polymeric composition comprising:

(A) a crosslinkable thermoplastic component which is a silane-modified organic polymer having hydrolysable groups attached to the silicon atoms thereof, (B) a fluorocarbon polymer of the aforedescribed type and (C) a silanol condensation catalyst which is preferably a dihydrocarbyl tin (IV) carboxylate. This further aspect of the present invention also includes a masterbatch for adding to the crosslinkable component (A), said masterbatch comprising the fluorocarbon polymer (B) and the silanol condensation catalyst (C) optionally with (D) a thermoplastic base polymer. The hydrocarbyl groups in the dihydrocarbyl tin (IV) carboxylate are preferably alkyl groups containing 1-12 carbon atoms, for example propyl, butyl, hexyl, octyl or decyl. The carboxylate groups in the tin compound can be provided by, for example, aliphatic or aromatic mono-or dicarboxylic acid. Preferred dihydrocarbyl tin compounds include dibutyl tin dilaurate, dibutyl tin dipalmitate, dibutyl tin distearate, dioctyl tin dilaurate and dibutyl tin maleate. Dihydrocarbyl tin (IV) carboxylates wherein the carboxylate function is provided by a dicarboxylic acid are particularly preferred (e.g. dibutyl tin maleate). Generally speaking, the quantity of dihydrocarbyl tin carboxylate employed should be sufficient to give a concentration in the crosslinkable composition in the range 0.001 to 3.0 moles, preferably 0.003 to 0.05 moles per mole of silyl units in the crosslinkable component. The quantity of the tin compound in the masterbatch will generally lie in the range 0.1 to 70 weight %, preferably 0.3 to 20 weight % based on the weight of the masterbatch. The quantity of fluorocarbonpolymer in the masterbatch can be, for example, 0.01 to 95 weight %, preferably 0.1 to 20 weight % based on the weight of the masterbatch. The optional thermoplastic base polymer (D) can be an suitable organic polymer which is compatible with the crosslinkable component and can be melt blended therewith. Examples of such base polymers (D) are conventional low density polyethylene, ethylene/vinyl acetate copolymer, ethylene/ethyl acrylate copolymer, linear low density polyethylene and high density PE.

The composition and process of the present invention can be used to make crosslinkable thermoformed articles having for example improved surface characteristics and reduced incidence of gel defects.

The invention is illustrated with reference to the following Examples.

EXAMPLES 1 AND 2 AND COMPARATIVE TESTS 1A and 2A

A masterbatch was prepared by compounding together Viton A fluoroelastomer pellets (DuPont) 2 parts, and a linear low density polyethylene (LL101AA BP Chemicals) 98 parts in a Werner and Pfeiderer ZSK 30 twin screw extruder at a screw speed of 200 revolutions per minute. The extruder temperature was about 150° C. close to the hopper zone, increasing to 190° C. at the extruder head. Extrusion was carried out to give a strand which was chopped to give pelleted masterbatch.

The pelleted masterbatch (5 parts by weight corresponding to 1000 ppm Viton A in the final compound) was dry blended with 95 parts by weight of the low density polyethylenes (from BP Chemicals) to be tested (see Table 1) and fed into the hopper of a Maillefer extruder equipped with a 30 mm screw having a L/D of 30:1 and a compression die head for coating 1.5 mm$^2$ copper wire. The temperature profile of the extruder and die was 150-160-170-180-190-190-190° C., the screw speed was 30 RPM and the wire take off speed was 10 metres per minute producing a cable of external diameter 2.7 mm. A mixture (M) of vinyl trimethoxy silane, (90 parts) dicumylperoxide (7.6 parts) and dibutyltindilaurate (2.4 parts) was pumped into the hopper throat such that for 100 parts resin there were 1.8 parts of the mixture. Comparative tests were made under identical conditions with the exception that the Viton A masterbatch was omitted. The cable samples were cured in water at 80° C. for one hour and subjected to heat elongation testing according to IEC 540 (200° C., 20 N cm$^{-2}$, 15 minutes) and tensile testing according to IEC 540.

Viton A is a copolymer having the formula $(CF_2-CH_2)n\ (CF_2-CF.CF_3)m$ wherein n/m is about 7/3. DFDM 2951 and 5951 are grades of polyethylene (low density) available from BP Chemicals.

TABLE 1

|  | Examples | | Comparative Tests | |
|---|---|---|---|---|
|  | 1 | 2 | 1A | 2A |
| DFDM.2951 | 95 | — | 100 | — |
| DFDM.5951 | — | 95 | — | 100 |
| Fluoroelastomer masterbatch | 5 | 5 | — | — |
| Mixture M | 1.8 | 1.8 | 1.8 | 1.8 |
| Extruder Power (Amps) | 8 | 10 | 10 | 11 |
| Surface Finish | glossy good | glossy good | matt good | matt good |
| Heat Elongation (%) | 50 | 35 | 50 | 40 |
| Tensile Stress at Break (MPa) | 17.1 | 17.9 | 16.2 | 16.9 |
| Elongation at Break (%) | 330 | 300 | 330 | 300 |

Examples 1 and 2 demonstrate the effect of the fluoroelastomer in reducing extruder power and providing a glossy surface finish to the extruded cable without reducing the mechanical properties of the cable.

EXAMPLES 3-5 AND COMPARATIVE TEST 3A

In Examples 3, 4 and 5 Viton A fluoroelastomer (DuPont) was incorporated into a masterbatch in varying proportions. In the comparative test no Viton A was incorporated into the masterbatch. The exact formulations of the masterbatch are shown in Table 2. The ingredients shown in Table 2 were blended together to make a masterbatch using a Werner and Pfleiderer ZSK 30 twin screw extruder at a screw speed of 200 revolutions per minute. The total quantity of composition prepared in each Example and in the Test was 10 kg per run. The extruder barrel temperature was about 140° C. close to the hopper zone, increasing to about 190° C. at the extruder head. Extrusion was carried out to give a strand which was chopped to give the pelleted masterbatch.

The pelleted masterbatch (5 parts by weight) was dry blended with 95 parts by weight of a silyl modified polymer prepared by copolymerising ethylene with vinyl trimethoxy silane under high temperature and high pressure conditions using a free radical initiator. The silyl modified polymer (EVTMS) contained 1.8 weight % of copolymerised vinyl trimethoxy silane, had a melt index (190° C.), 2.16 Kg load) of 0.7 and a density of 923 Kg/m$^2$.

The concentrations of fluoroelastomer in Examples 3, 4 and 5 were thus 500, 250 and 100 ppm respectively.

The dry blend was fed into the hopper of a Francis-Shaw Extruder equiped with 2½ inch screw having L:D of 23:1 and a die diameter of 2.2 mm through which a copper wire of 0.6 mm diameter passed. The die temperature was 200° C. and the screw speed was 50 RPM. The coated wire was taken off at 200 meters/minute producing a cable of external diameter 2.05 mm. It was observed that less die drool formed in Examples 3,4 and 5 than in Example 3A. The extruder cable was cured by immersion in a water bath thermostatted at 80° C.

Visual examination of the cables produced using the composition of the present invention (Examples 3, 4 and 5) showed the surface of the cables to be smooth and glossy (3 and 4 better than 5) even after 1 hour's extrusion time. On the other hand, cable produced from the composition of Comparative Test 3A exhibited a matt finish and a more grainy surface.

All samples showed essentially identical tensile and thermo mechanical properties indicating that the fluoroelsatomer does not impair the crosslinking reaction.

The incorporation of the fluoroelastomer proviees a significant reduction in extruder power.

TABLE 2

| Masterbatch Formulations | MB3 | MB4 | MB5 | MB3A |
|---|---|---|---|---|
| Viton A | 1.00 | 0.50 | 0.20 | — |
| Dibutyltin maleate | 0.75 | 0.75 | 0.75 | 0.75 |
| Slip Agent | 1.5 | 1.5 | 1.5 | 1.5 |
| Antioxidant | 6.0 | 6.0 | 6.0 | 6.0 |
| LDPE | 90.75 | 91.25 | 91.55 | 91.75 |

| | Extruder | Amps | Head Pressure | Surface Finish |
|---|---|---|---|---|
| Example 3 EVTMS | + MB3 (5%) | 23 | 140 | Excellent glossy |
| Example 4 EVTMS | + MB4 (5%) | 24 | 150 | Excellent glossy |
| Example 5 EVTMS | + MB5 (5%) | 26 | 155 | Good |
| Test 3A | + MB3A | 26 | 158 | Good Matt |

TABLE 2-continued

| EVTMS | (5%) |
|---|---|

We claim:
1. A thermoformable and crosslinkable composition comprising
   (A) a crosslinkable thermoplastic component which is a silane-modified organic polymer having hydrolysable groups attached to the silicon atoms thereof,
   (B) 0.002 to 2.0 weight %, based on the weight of the crosslinkable component, of a fluorocarbon polymer and
   (C) a silanol condensation catalyst.

2. A composition as claimed in claim 1 wherein the fluorocarbon polymer is a homopolymer or copolymer of one or more of vinylidene fluoride, vinyl fluoride, chlorotrifluoro ethylene, tetrafluoroethylene and hexafluoropropylene.

3. A composition as claimed in claim 1 wherein the fluorocarbon carbon polymer is a copolymer of hexafluoropropylene and vinylidene fluoride.

4. A composition as claimed in claim 1 wherein the crosslinkable component is thermally crosslinkable.

5. A composition as claimed in claim 1 wherein the crosslinkable component is a silane-modified polymer having hydrolysable groups crosslinkable by hydrolysis.

6. A composition as claimed in claim 1 wherein the quantity of fluorocarbon employed is in the range 0.03 to 0.4 weight % based on the weight of the crosslinkable component.

7. A composition as claimed in claim 5 wherein the quantity of fluorocarbon polymer is in the range 100 to 450 ppm based on the weight of the crosslinkable component.

8. An extruded or extrusion-coated article comprising the product of extruding and subsequently thermally or chemically crosslinking a composition as claimed in claim 1.

9. A composition as claimed in claim 1 wherein the fluorocarbon polymer melts or softens at a temperature in the range 100° to 300° C.

10. A composition as claimed in claim 1 wherein the fluorocarbon polymer has an atomic ratio of fluorine to carbon of at least 1:2.

11. A composition as claimed in claim 1 wherein the silyl organic polymer is a copolymer prepared by copolymerising an olefinically unsaturated compound with an unsaturated silane compound having hydrolysable groups.

12. A composition as claimed in claim 1 wherein the silyl modified organic polymer is prepared by grafting an unsaturated silane compound having hydrolysable silane groups on to an organic polymer or copolymer selected from polyethylene or a copolymer of ehtylene with one or more alpha olefins, vinyl esters, alkyl (meth) acrylates, unsaturated nitriles or unsaturated ethers.

13. A composition as claimed in claim 11 or claim 12 wherein the unsaturated silane compound is selected from vinyl trimethoxy silane, vinyl triethoxy silane and vinyl triacetoxy silane.

14. A composition as claimed in claim 11 or claim 12 wherein the copolymer or graft copolymer contains 0.1 to 10 weight % of copolymerised units of the silane compound.

* * * * *

UNITED STATES PATENT AND TRADEMARK OFFICE
CERTIFICATE OF CORRECTION

PATENT NO. : 4,707,517

DATED : November 17, 1987

INVENTOR(S) : DAVID J. BULLEN, et al

It is certified that error appears in the above-identified patent and that said Letters Patent is hereby corrected as shown below:

Col. 7, line 47, correct the spelling of
---"fluoroelastomer"---

Col. 7, line 49, correct the spelling of ---"provides"---

Claim, 3, line 2, after "fluorocarbon" strike --- "carbon".

Claim 11, line 2, after "silyl" and before "organic insert
---"modified"---

Claim 12, line 5, correct the spelling of --- "ethylene".

Signed and Sealed this

Twenty-eighth Day of June, 1988

Attest:

DONALD J. QUIGG

Attesting Officer     Commissioner of Patents and Trademarks